(12) United States Patent
Eason et al.

(10) Patent No.: US 7,267,306 B2
(45) Date of Patent: Sep. 11, 2007

(54) HYBRID SUPPORT BRACKET FOR RAILCAR AIR BRAKE HOSE

(75) Inventors: Charles G. Eason, Dollard-des-Ormeaux (CA); Varoujan Khatchadourian, Montreal (CA)

(73) Assignee: Consolequip Inc., Montreal, Quebec (CA)

( * ) Notice: Subject to any disclaimer, the term of this patent is extended or adjusted under 35 U.S.C. 154(b) by 190 days.

(21) Appl. No.: 11/038,250

(22) Filed: Jan. 21, 2005

(65) Prior Publication Data

US 2006/0163442 A1 Jul. 27, 2006

(51) Int. Cl.
*F16L 3/00* (2006.01)

(52) U.S. Cl. ............................ 248/53; 248/75; 248/58; 213/76

(58) Field of Classification Search ................ 248/75, 248/53, 58; 213/176, 76
See application file for complete search history.

(56) References Cited

U.S. PATENT DOCUMENTS

| 1,127,584 | A | * | 2/1915 | Brown | 213/76 |
| 3,567,041 | A | * | 3/1971 | Seay | 213/1 R |
| 3,587,868 | A | * | 6/1971 | Yates | 213/1 R |
| 3,592,425 | A | * | 7/1971 | Randolph et al. | 248/53 |
| 4,366,965 | A | * | 1/1983 | Rhodes | 280/421 |
| 4,986,500 | A | * | 1/1991 | Campbell | 248/53 |
| 2004/0155005 | A1 | * | 8/2004 | Murphy | 213/76 |

* cited by examiner

*Primary Examiner*—Carl D. Friedman
*Assistant Examiner*—Michael McDuffie
(74) *Attorney, Agent, or Firm*—Ogilvy Renault LLP

(57) ABSTRACT

A hybrid support bracket for supporting a flexible end hose of a railcar air brake hose assembly is described. The bracket has a free end of a predetermined length and a train line support unit is displaceable along the displaceable free end. The train line support union has a connector which connects an end of the flexible end hose to the brake hose assembly. The hybrid bracket is secured to the yoke of a coupler and is displaceable therewith. The displaceable free end and train line support union permit relative displacement between the hybrid bracket and the hose support to compensate for the slack of the coupler due to wear.

5 Claims, 3 Drawing Sheets

HYBRID SUPPORT BRACKET FOR RAILCAR AIR BRAKE HOSE

TECHNICAL FIELD

The present invention relates to a hybrid bracket for supporting a flexible end hose of a railcar air brake hose assembly, and wherein the bracket has a displaceable hose support which permits relative displacement between the bracket and the hose support to provide for wear allowance of the coupler and cushion unit system and for wear allowance in the end of car pocket including stops.

BACKGROUND ART

The unintentional uncoupling or separation of railway cars such as freight car air brake end hoses, while trains are in motion, causes an emergency application of the train's air brakes, an event known as an Undesired Emergency, or UDE. Such a brake application can result in a number of potentially negative consequences. Such consequences include train delays, and not only to the train involved with a UDE, but also to other trains both behind and in front of the train that has the uncoupled air brake line. Urgent train stops also cause possible freight car structural damage and component breakage, i.e., couplers, knuckles, pins, keys and cushion units, etc. They can also damage the commodity carried by such freight cars. Such uncoupling, therefore, results in increased costs due to the re-crewing of trains, overtime to repair cars on line, and loss of productivity.

Such accidental uncoupling also can result in negative impact on the carrier's ability to meet customer commitments, resulting in customer complaint and possible loss in revenue. There are also safety concerns of crew members who must walk along the train to assess the cause of the UDE, which is particularly dangerous in severe weather conditions.

Public inconvenience due to potentially blocked public crossings, particularly in densely populated areas, is another resulting problem. There is also the potential for train derailment. Accordingly, the uncoupling or separation of a railcar air brake end hose can result in serious consequences.

The separation of air brake end hoses can occur when the relative position of the gladhands which interconnect the end hoses of two coupled cars changes due to excessive slack in the end of car components.

On freight cars equipped with cushioned units, the air brake end hose is connected to the intermediate air brake hose by means of a rigid or train line support union, which is supported either by the conventional train line bracket or fixed trolley rod arrangement. The conventional train line bracket is attached to the cushion unit yoke through the use of a bolt and a locknut to secure it in place. The intermediate hose, which supplies pressurized air from the angle cock valve to the freight car brake system, is connected to the car end hose through a rigid train line support union that is secured to the conventional train line bracket.

The conventional train line bracket moves with the yoke as the cushion unit moves inboard and outboard to absorb the energy imparted by train action when in service. Train action causes wear in end of car components. A disadvantage of this design is its inability to compensate for end of car component wear. This wear causes excessive slack between the coupler and the yoke, thereby affecting the performance of the car end hoses. This can cause two coupled car end hoses to become kinked or separated. When car end hoses separate, the train will go into a UDE, and when they kink, brakes are lost from the kinked hose back to the tail end of the train.

The fixed trolley rod arrangement presently applied on car ends is welded to the freight car structure. This design compensates for end of car component wear by incorporating a long rod along which the train line support union freely travels, thereby maintaining the alignment of the car end hoses. However, as the fixed trolley does not move with the cushion unit, it needs to have enough travel to extend beyond the car end to allow for extreme inboard or outboard coupler movement. This extension makes the device susceptible to damage and may cause it to interfere with other end of car components. U.S. Patent Publication No. 2004/0155005 teaches a strap suspension assembly with a swivel displaceable on a fixed rod which is not coupled to the yoke.

SUMMARY OF INVENTION

The hybrid bracket concept of the present invention provides an innovative solution by integrating the beneficial features of both the fixed train line bracket device and the trolley rod arrangement. The hybrid bracket concept allows free movement of end hose and intermediate hose union while maintaining the movement of the bracket relative to the cushion unit. This is achieved by integrating a displaceable connection and train line support union, or some other means with a linked connection, into the fixed train line bracket design. This combined action allows for optimal alignment and positioning of the car end hose glad hand with respect to coupler pulling face, thus reducing the chances for hose separations or kinking.

It is therefore a feature of the present invention to provide a support bracket which substantially overcomes the above-mentioned disadvantages of the conventional train line bracket and the fixed trolley rod arrangement of the prior art.

According to the above feature, from a broad aspect, the present invention provides a hybrid bracket for supporting a flexible end hose of a railcar air brake hose assembly. The flexible end hose is removably connected at one end to another end hose of an adjacent coupled railcar. The bracket has coupling means at an attaching end thereof for securement to a railcar coupler whereby to be displaced therewith. The bracket has a free end provided with a displaceable hose support permitting relative displacement between the bracket and the hose support to compensate for wear allowance of the coupler. The displaceable hose support is adapted to support a hose connector to interconnect another end of said flexible end hose to the hose assembly. The bracket has an elongated support arm and a trolley rod of predetermined length is secured to the support arm. A swivel hose support is displaceable along the trolley rod. The swivel hose support has a hose connector to interconnect the other end of the flexible end hose to the hose assembly. The hybrid bracket is immovably secured to a yoke of a cushion unit of the railcar coupler. The yoke is axially displaceable. The coupler has a beam secured to the yoke by connector means. The coupler further has a connecting clamp for interconnection with a further connecting clamp of a further coupler of an adjacent railcar. The connector means and connecting clamp are subjected to wear and exhibits slack which is compensated by the displaceable hose support to prevent unwanted tensile or compressive forces on the flexible end hose due to the slack.

According to another broad aspect of the present invention, the displaceable hose support is comprised of a displaceable connection of predetermined length and a train line support union displaceable along the displaceable connection of predetermined length.

BRIEF DESCRIPTION OF DRAWINGS

A preferred embodiment of the present invention will now be described with reference to the accompanying drawings, in which.

DESCRIPTION OF PREFERRED EMBODIMENTS

Figure 1:
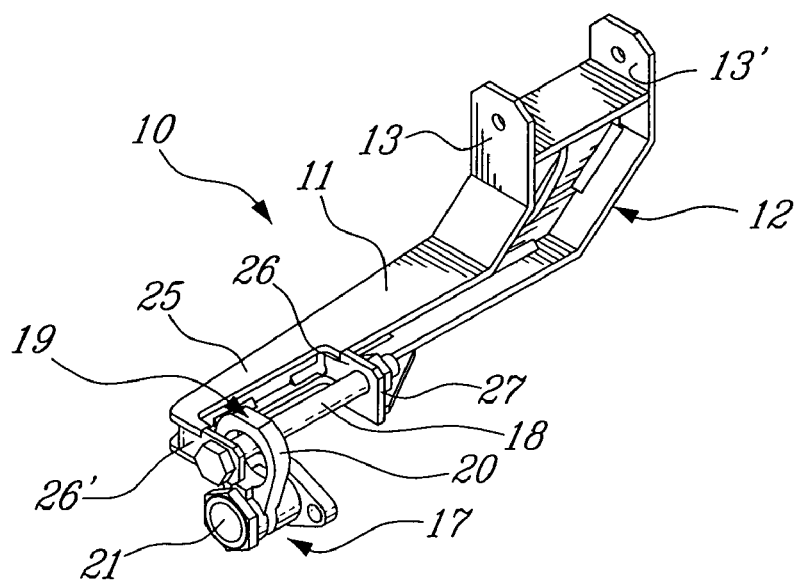
FIG. 1 is a perspective view of a hybrid bracket constructed in accordance with the present invention.
Figure 2:
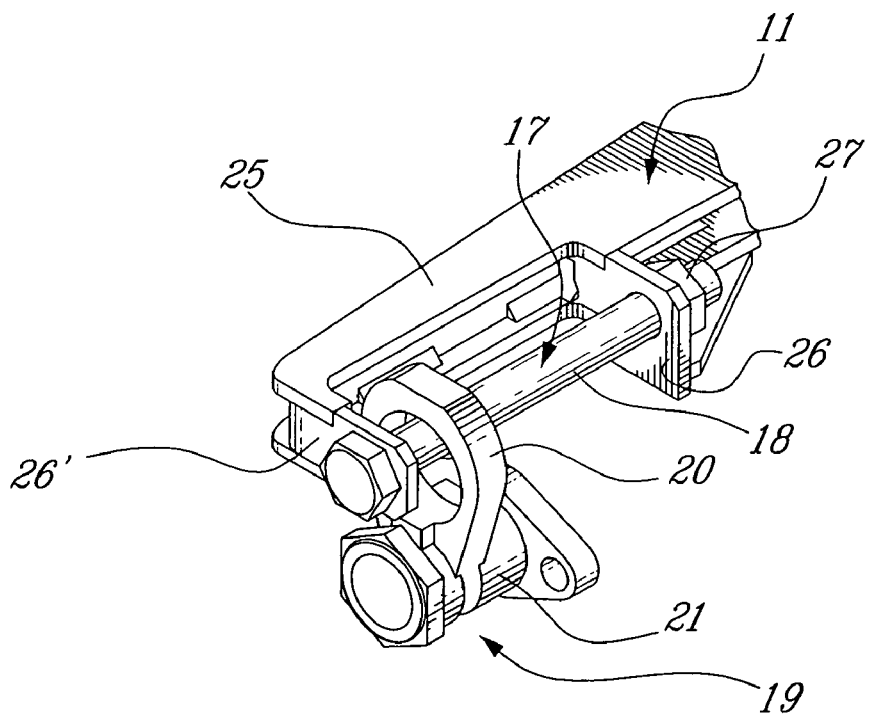
FIG. 2 is an enlarged perspective view showing a preferred construction of the displaceable hose support.
Figure 3:
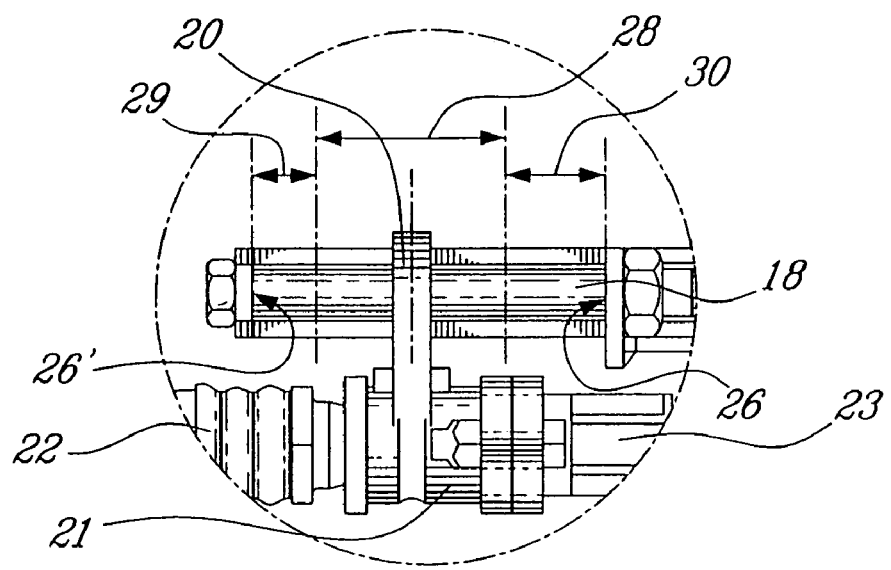
FIG. 3 is an enlarged fragmented side view illustrating the operation of the displaceable hose support.
Figure 5A:
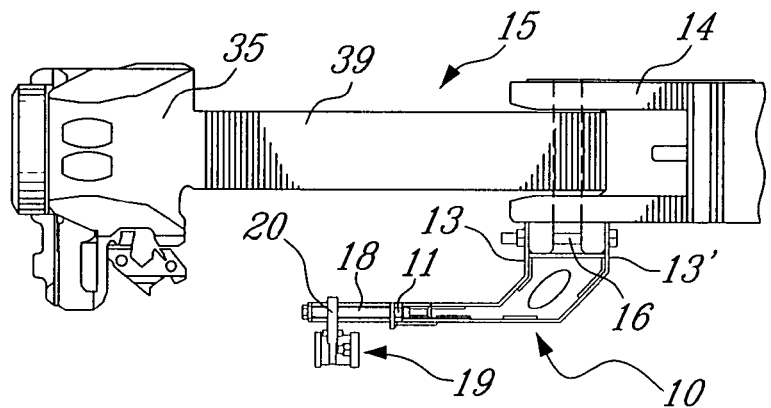
FIGS. 5A and 5B are side views showing the connection of the hybrid bracket to the yoke of the coupler, and showing the movement of the coupler due to wear, as well as the movement of the train line support union to compensate for the wear.

Referring now to the drawings, and more particularly to FIGS. 1 to 3, there is shown generally at 10 the hybrid bracket of the present invention. The rigid bracket 10 has an elongated support arm 11, and a substantially transverse attaching end 12 provided with spaced-apart connecting flanges 13 and 13' for support connection to the yoke 14 of a railcar coupler 15, as shown in FIG. 5A. The transverse attaching end 12 is connected by a bolt 16, as shown in FIG. 5A. Accordingly, the hybrid bracket 10 is displaceable with the yoke 14 and coupler 15, as the yoke is connected to the coupler.

The innovative feature of the hybrid bracket of the present invention is the provision of a displaceable hose support generally shown at 17, and it is comprised of a trolley rod 18, of predetermined length, and a train line support union 19 displaceable along the trolley rod 18.

The train line support union has a sliding ring 20 through which the trolley rod 18 extends. A hose connector 21 is secured to the sliding ring 20 and suspended thereby for interconnecting a flexible end hose 22 to an intermediate hose 23 of an air brake train line 24, is illustrated in FIG. 4A.

As better seen in FIG. 2, the displaceable hose support 17 is supported by the free end portion 25 of the elongated support arm 11. The trolley rod 18 is formed by a straight bolt of circular cross-section secured between two support flanges 26 and 26', and a locknut 27 secures the bolt thereacross for unobstructed displacement of the sliding ring 20.

As shown in FIG. 3, the spacing between the flanges 26 and 26' or the predetermined length of the trolley rod 18 is calculated to include a wear allowance factor or length, as shown at 28, as well as outboard clearance 29 and inboard clearance distances 30. The flanges 26 and 26' act as stoppers. It is pointed out that the displaceable hose support 17 could also be constructed differently, while providing relative displacement between the bracket and the displaceable hose support 17. For example, the sliding ring 20 could be connected to a support which is displaceable in a slot formed in the free end portion 25 of the support arm 11. The slot would have the predetermined length and the sliding ring could pivot about its attachment. Further, the displaceable hose support may be comprised of interconnected pivotal link arms secured at one end to the free end of the bracket and at an opposed end to the train line support union. Other obvious modifications are contemplated.

Figure 4A:
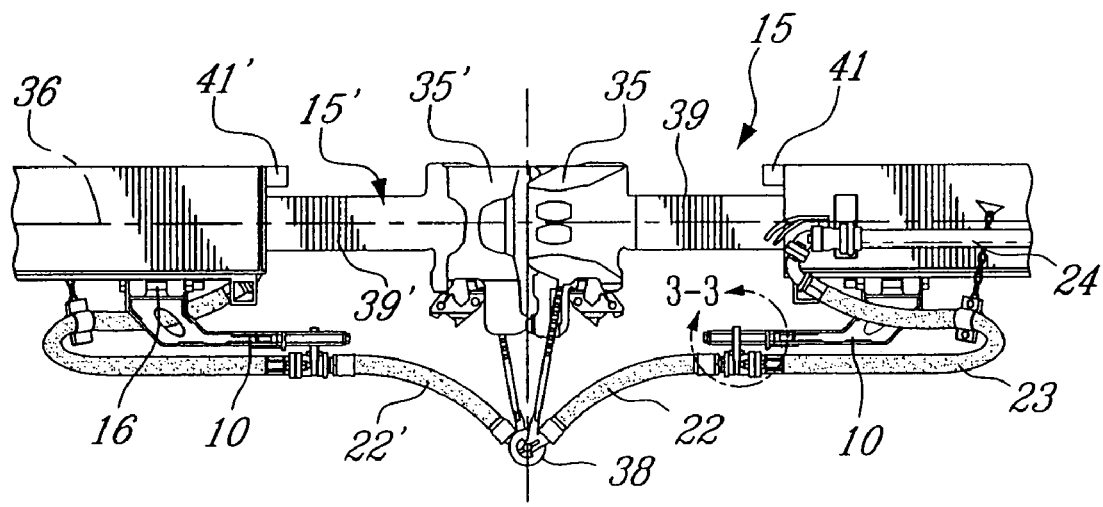
FIGS. 4A and 4B are side views showing the couplers of two adjacent railcars interconnected together, with FIG. 4A illustrating the coupler in full draft, and FIG. 4B illustrating the coupler in full buff.
Figure 4B:
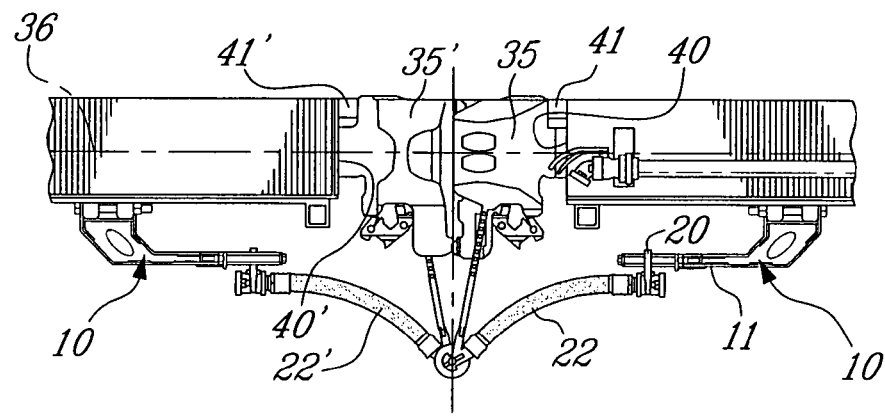
Figure 5B:
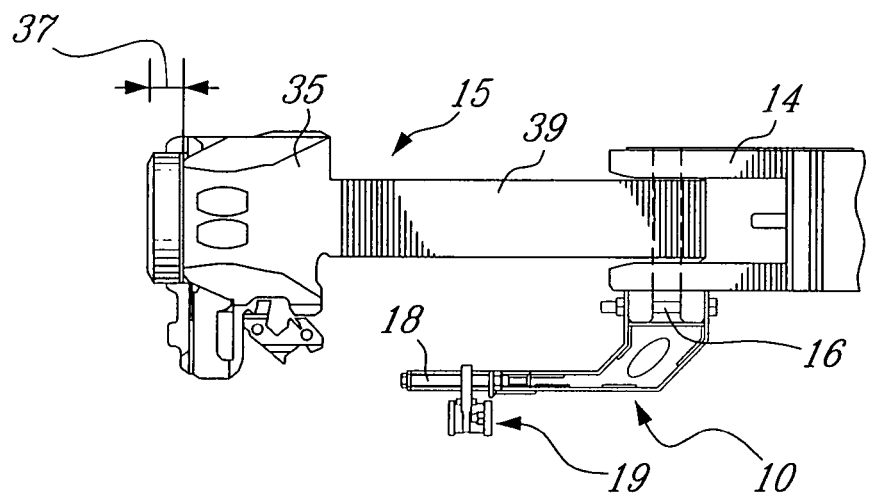

With reference now to FIGS. 4A and 4B, there is shown two couplers 15 and 15', interconnected together by their clamps 35 and 35' respectively, and in a manner well known in the art. The yokes, such as the yoke 14,is part of a cushion unit, not shown but obvious to a person skilled in the art, and when these clamps are interconnected together, they move along their coupler centerline 36 (see FIG. 4B) at various positions from a full draft position as illustrated in FIG. 4A, where both couplers 15 and 15' are fully extended outwards of their respective railway cars to a full buff position, as illustrated in FIG. 4B, where the couplers are at their closest positions to their respective railway cars. This outward and inward displacement of the couplers or adjacent ends of adjacent railcars causes wear or slack in the coupler connections with the yoke or in the clamps, as previously described. Accordingly, the couplers can be displaced within the total wear region with the hybrid bracket still remaining stationary. However, the end hose is connected to the clamps and will be displaced. In order to prevent this displacement to apply a tensile or compressive force on the end hoses, the displaceable train line support union 19 moves along the trolley rod 18, as illustrated in FIGS. 5A and 5B, to compensate for the wear displacement.

The wear displacement is illustrated by reference numeral 37 in FIG. 5B, and because the flexible end hoses 22 and 22' are interconnected together by the gladhands 38 (see FIG. 4A), the sliding motion of the swivel support 19 would prevent the flexible end hoses 22 and 22' from peaking or kinking due to a tensile or compressive force applied thereto by the movement of the clamps due to wear. Such tensile or compressive force on the gladhands can cause accidental disconnection thereof. However, with the present invention, such tensile or compressive force is compensated simply by the displacement of the train line support union 19 along the trolley rod 18, preventing the tensile and compressive forces, as is clearly illustrated in FIGS. 5A and 5B. As previously described and illustrated in FIGS. 4A and 4B, the hybrid bracket is rigidly connected to the yoke 14 and moves therewith. Therefore, when the beams 39 and 39' are fully extended, as shown in FIG. 4A or at full draft, the hybrid support bracket is outboard to ends 40 and 40' of the railcar bodies, and when compressed, as shown in FIG. 4B or at full buff, the hybrid brackets are inboard from the ends 40 and 40'. As also herein shown, a striker 41 and 41' arrests the displacement of the clamps 35 and 35', and this is well known.

It is within the ambit of the present invention to cover any obvious modifications of the embodiments described herein, provided such modifications fall within the scope of the appended claims.

We claim:

1. A hybrid bracket for supporting a flexible end hose of a railcar air brake hose assembly, said flexible end hose being removably connected at one end to another end hose of an adjacent coupled railcar, said bracket having coupling means at an attaching end thereof for securement to a railcar coupler whereby to be displaced therewith, said bracket having a free end provided with a displaceable hose support permitting relative displacement between said bracket and said hose support to compensate for wear allowance of said coupler, said displaceable hose support being adapted to support a hose connector to interconnect another end of said flexible end hose to said hose assembly, said bracket having an elongated support arm, a trolley rod of predetermined length secured to said elongated support arm, a swivel hose support is displaceable along said trolley rod, said swivel hose support having a hose connector to interconnect said other end of said flexible end hose to said hose assembly, said hybrid bracket being immovably secured to a yoke of a cushion unit of said railcar coupler, said yoke being axially displaceable, said coupler having a beam secured to said yoke by connector means, said coupler having a connecting clamp for interconnection with a further connecting clamp of a further coupler of an adjacent railcar, said connector means and connecting clamp being subjected to wear and exhibiting slack which is compensated by said displaceable hose support to prevent unwanted tensile or compressive forces on said flexible end hose due to said slack.

2. A hybrid bracket as claimed in claim 1, wherein said trolley rod is supported adjacent a free end portion of said elongated support arm, said rod being a straight bolt of circular crosssection secured between two support flanges.

3. A hybrid bracket as claimed in claim 2, wherein said swivel hose support has a sliding ring support through which said straight bolt extends, said sliding ring being displaceable between said two support flanges, said hose connector being suspended by said sliding ring.

4. A hybrid bracket as claimed in claim 3, wherein said predetermined length is calculated by the sum of a wear allowance displacement for said slack and outboard and inboard clearances.

5. A hybrid bracket as claimed in claim 1, wherein said flexible end hose of adjacent interconnected railcars are joined together at said one end by gladhand connectors.

* * * * *